(12) United States Patent
Siegel et al.

(10) Patent No.: US 12,112,452 B2
(45) Date of Patent: Oct. 8, 2024

(54) HOLOGRAPHIC ULTRA RESOLUTION IMAGING

(71) Applicant: CELLOPTIC, INC., Rockville, MD (US)

(72) Inventors: Nisan Siegel, Silver Spring, MD (US); Gary Brooker, Rockville, MD (US)

(73) Assignee: CELLOPTIC, INC., Rockville, MD (US)

( * ) Notice: Subject to any disclaimer, the term of this patent is extended or adjusted under 35 U.S.C. 154(b) by 602 days.

(21) Appl. No.: 17/379,672

(22) Filed: Jul. 19, 2021

(65) Prior Publication Data

US 2022/0020116 A1 Jan. 20, 2022

Related U.S. Application Data

(60) Provisional application No. 63/053,909, filed on Jul. 20, 2020.

(51) Int. Cl.
*G06T 3/4076* (2024.01)
*G03H 1/26* (2006.01)
*G06T 5/50* (2006.01)
*G06T 7/00* (2017.01)

(52) U.S. Cl.
CPC ............ *G06T 3/4076* (2013.01); *G03H 1/26* (2013.01); *G06T 5/50* (2013.01); *G06T 7/0002* (2013.01); *G03H 2226/02* (2013.01); *G06T 2207/30168* (2013.01)

(58) Field of Classification Search
CPC ....... G06T 3/4076; G06T 5/50; G06T 7/0002; G06T 2207/30168; G06T 3/4053; G03H 1/26; G03H 2226/02; G03H 2001/0458; G03H 2001/0816; G03H 2240/56; G03H 1/0808; G03H 2001/0883; G03H 1/0866; G03H 2001/005; G03H 2001/0447; G03H 2222/24; G03H 1/0443; G06N 3/126
See application file for complete search history.

(56) References Cited

U.S. PATENT DOCUMENTS

| | | | |
|---|---|---|---|
| 2012/0218379 A1* | 8/2012 | Ozcan | G03H 1/06 348/40 |
| 2013/0215218 A1* | 8/2013 | Pavani | G08G 1/166 348/40 |
| 2016/0246255 A1* | 8/2016 | Brooker | G03H 5/00 |

(Continued)

OTHER PUBLICATIONS

Rosen, Joseph, and Gary Brooker. "Fresnel incoherent correlation holography (FINCH): a review of research", Adv. Opt. Techn., vol. 1 (2012): 151-169.*

(Continued)

*Primary Examiner* — Xuemei G Chen
(74) *Attorney, Agent, or Firm* — Nixon & Vanderhye, PC

(57) ABSTRACT

An advance in ultra-high-resolution optical imaging has been achieved by the introduction of iterative high-resolution image-building algorithms to incoherent holography. A recorded FINCH hologram is used as the basis of a method in which a high resolution image is built using detailed knowledge of the point spread functions of the FINCH hologram or reconstructed image, and then iteratively improved by successive algorithm generations of comparison to the recorded FINCH hologram and alteration of the high resolution image.

10 Claims, 18 Drawing Sheets

(56) References Cited

U.S. PATENT DOCUMENTS

2017/0052508 A1* 2/2017 Brooker .............. G02B 5/3083
2021/0075947 A1* 3/2021 Rosen .................. G02B 26/06

OTHER PUBLICATIONS

Rosen, Joseph, Nisan Siegel, and Gary Brooker. "Theoretical and experimental demonstration of resolution beyond the Rayleigh limit by FINCH fluorescence microscopic imaging." Optics express 19.27 (2011): 26249-26268.*

* cited by examiner

HOLOGRAPHIC ULTRA RESOLUTION IMAGING

CROSS REFERENCE TO RELATED APPLICATIONS

This application claims priority to U.S. Provisional Application No. 63/053,909 filed Jul. 20, 2020, the entire content of which is hereby incorporated by reference.

TECHNICAL FIELD

This disclosure generally relates to performing optical imaging at resolution improved by more than two-fold compared to ordinary optical imaging, and more particularly to using image computation algorithms coupled with incoherent holograms to create processed images with ultra high optical resolution.

BACKGROUND ART

Optical image formation is classically limited in resolution by the wavelength of light, focusing lens, and the spreading and blurring of light emanating from the imaged object according to the point-spread function (PSF) of the imaging system. The classical limit of resolution, even with best quality lenses, is approximately half the wavelength of the light recorded by the imaging system. For example, an object with a dimension of 1 nm size will be measured as being ca. 250 nm in size by an imaging system using light of wavelength 500 nm. This fact means that optical imaging methods are generally of little value in measuring or viewing information about objects that are smaller than 200 nm. As optical imaging is generally easy and relatively non-destructive, it would be desirable to be able to create optical images of objects on the size scale of tens of nm or even less.

There are many techniques called super resolution imaging that have recently emerged to evade this optical resolution limit. These methods overcome the optical limit in a variety of ways by factors ranging from $2x$-$10x$ improvement. Amongst these are Fresnel Incoherent Correlation Holography (FINCH), Structured Illumination Microscopy (SIM), Stimulated Emission Depletion (STED), Photoactivated Localization Microscopy (PALM), Stochastic Optical Reconstruction Microscopy (STORM) and other stochastic methods, photon reassignment techniques, and others, all of which are well-known to one skilled in the art. It is important to note that in all these methods, a PSF is still present thus creating a blur and limiting the optical resolution. However, these various techniques are able to use fitting procedures or complex illumination methods to overcome some of the assumptions of classical imaging, so that more information can be inferred about objects.

Of the resolution-improving examples mentioned above, FINCH (Fresnel Incoherent Correlation Holography) is a self-referenced holographic method that uses incoherent light originating at the object to create interference patterns or holograms that are recorded by a camera. One of a number of incoherent and/or self-interference holography methods, FINCH is a well developed imaging technology that serves as an exemplar of a higher resolution optical method that can be used with computational image processing to create images with resolution better than that of standard optical imaging. A full description of FINCH will be provided later herein. For discussion of background art here it is sufficient to note that the FINCH hologram recording consists of recording some number (usually three or four) of phase shifted "raw" holograms, which are intensity records, and which are then further processed into a complex valued hologram. The raw holograms may be recorded sequentially, or in light of recent advances, may be recorded simultaneously. The complex valued hologram is then processed with an appropriate "reconstruction PSF" to reconstruct the image of the object. Note that a FINCH reconstructed image is up to twice as high optical resolution as a classical image. In the case of FINCH the resolution is about two times better than classical imaging, resulting in a best obtainable optical resolution with FINCH on the order of 100 nm. A way to further improve the resolution five- or tenfold would result in an optical method as simple to operate as a standard camera and would have widespread applications in all fields of imaging.

One way to improve imaging performance in general is to use one of a class of methods called deconvolution, in which knowledge of the PSF of the system is used to computationally reverse some of the effects of the PSF blur in an observed image of an object and create a processed image that has higher fidelity to the actual object. However, these methods as a rule do not increase resolution by a large degree. In a different approach, it is possible to algorithmically build a model of the imaged object, at arbitrarily high resolution. The model object may be used along with detailed knowledge of the optical system PSF to create a simulated image, which may then be compared to the actual observed image or images. The quality of the match may then be assessed, and the model object improved by some means for the next round of comparisons in the algorithm. Once the model object attains a certain quality, the algorithm may be halted and the final model object may be accepted as an accurate ultra-high resolution representation of the actual object. This model-building approach bears the benefit of a potentially unlimited resolution, but does require computational resources and a thorough knowledge of the PSF. In practice, the PSF of standard optical systems is generally featureless and relatively depth invariant, as well as still being limited by the conventional optical resolution limit. These factors limit the potential resolution of this approach with conventional recorded images to a range of several scores of nanometers (nm).

The use of other types of recorded images with a model-building approach, however, offers the opportunity of addressing the factors listed above.

SUMMARY OF EXAMPLE EMBODIMENTS OF THE INVENTION

A versatile method of obtaining images with resolution improved by a factor of 5-10 (ultra-resolution) over standard imaging, with simple image acquisition and modest requirements for imaging conditions would provide great advantages over prior ultra-resolution methods. In the present invention denoted HURL (for Holographic Ultra-Resolution Imaging), a model building approach is used with observed images derived from FINCH holograms, which are higher resolution and have more detailed features than images recorded with standard optical PSFs. The greater resolution, detailed features, and depth-variant form of the PSFs of FINCH holograms and reconstructed images all permit the model-building image computational approach to offer a higher resolution potential than model-building with standard optical PSFs, with HURI having resolution potential into the range of a few dozen nm, about a factor of 10 improvement compared to standard imaging. The model-building approach of this invention involves two main components: the recording of the observed image, and the creation of the model object that forms the basis of the ultra-resolution image. For the recording of the observed image, holographic methods are of interest, since they are by their nature well-suited to three-dimensional imaging and have resolution equivalent to or better than standard optical imaging. Incoherent Holographic Imaging (IHI) methods are of particular interest as they avoid many of the difficulties of coherent holography. Crucially, in holography including IHI, the image information from any individual point of the object impinges upon a large area of the image detector, meaning that the recorded image contains many points bearing object information about each point, which can then be used with the model-building algorithm to improve the model object fidelity to the observed image. This is as opposed to the small area and few image points containing information about a given object point that is the case with standard imaging, which limits the extent of the comparisons that can be made between the simulated images and the actual observed images. The most well-developed IHI method is FINCH, which is able to create incoherent holograms with twice the resolution of normal optical imaging, and can do so in a robust manner in a single exposure with the highest possible operational stability due to its status as a single-optical-path method with inherently stable interferometer alignment. Thus example embodiments of the instant invention of Holographic Ultra Resolution Imaging are described in the context of FINCH imaging as the method for recording observed images, but one skilled in the art will realize that embodiments can be practiced with other IHI methods as well.

Accordingly, one object of the present disclosure is to provide a method for creating images of objects, in which light originating at the object is recorded in the form of an absolute-valued incoherent self-interference FINCH hologram. The hologram is then computationally processed to create a reconstructed image of the object. The reconstructed image is then used as the basis "recorded image" in a further computational image processing algorithm in which a virtual model object is created and iteratively refined to provide an ultra-high resolution image corresponding to the "recorded image."

Another object of the present disclosure is to provide a method for creating images of objects, in which light originating at the object is recorded in the form of an absolute-valued incoherent self-interference FINCH hologram. The hologram is then computationally processed to create a complex-valued hologram of the object. The complex-valued hologram is then used as the basis "recordedimage" in a further computational image processing algorithm in which a virtual model object is created and iteratively refined to provide an ultra-high resolution image corresponding to the "recorded image."

Another object of the present disclosure is to provide a method for creating images of objects, in which light originating at the object is recorded in the form of an absolute-valued incoherent self-interference FINCH hologram with one or more phase factors of self interference, wherein the term "phase factor" refers to a constant phase difference between the interfering light waves. A single phase factor of the recorded FINCH hologram is then used as the basis "recorded image" in a further computational image processing algorithm in which a virtual model object is created and iteratively refined to provide an ultra-high resolution image corresponding to the "recorded image."

Another object of the present disclosure is to provide a method for creating images of objects, in which light originating at the object is recorded in the form of an absolute-valued incoherent self-interference FINCH hologram with one or more phase factors of self interference, wherein the term "phase factor" refers to a constant phase difference between the interfering light waves. Multiple phase factors of the recorded FINCH hologram are then used as the basis "recorded images" in a further computational image processing algorithm in which a virtual model object is created and iteratively refined to simultaneously match the multiple phase factors and thereby provide an ultra-high resolution image corresponding to the "recorded image."

DESCRIPTION OF EXAMPLE EMBODIMENTS

The inventors of the subject matter in this disclosure include an inventor of the Fresnel Incoherent Correlation Holography (FINCH) techniques and systems that are described in, for example, U.S. Pat. No. 8,179,578 Filed Jul. 18, 2006. The inventors of FINCH also published several papers describing the FINCH system and technique. See, for example, Joseph Rosen and Gary Brooker, "Digital spatially incoherent Fresnel holography", Optics Letters, Vol. 32, No. 8, Apr. 15, 2007. The contents of U.S. Pat. No. 8,179,578 and the publication "Digital spatially incoherent Fresnel holography" are each incorporated herein by reference in their respective entireties.

The inventors of the subject matter described in this application, amongst others, subsequently improved upon the original FINCH technique described in U.S. Pat. No. 8,179,578, leading to, in one particular improved implementation, using one or more birefringent lenses in association with FINCH in order to achieve super resolution in the obtained holographic images. U.S. Pat. No. 10,228,655 (which claims priority to US Provisional Application No. 61/886,064 filed on Oct. 3, 2013) describes FINCH using a liquid crystal lens (which is also birefringent). The use of a birefringent crystal lens in FINCH was described in a provisional application that was filed May 1, 2014, which was subsequently claimed priority to in patent applications US Patent Application Publication Nos. 20170242398, 20170185036, 20170052508, and U.S. Pat. No. 10,289,070. This novel use of a birefringent lens in FINCH was also described in Nisan Siegel, Vladimir Lupashin, Brian Storrie and Gary Brooker, "High-magnification super-resolution FINCH microscopy using birefringent crystal lens interferometers", Nature Photonics, 14 Nov. 2016. Further developments in the phase shifting procedure used in the recording of FINCH holograms is described in PCT patent application No. PCT/US20201040683 as well as in Nisan Siegel and Gary Brooker, "Single shot holographic super-resolution microscopy," Optics Express 29, 15953-15968 (2021). The contents of U.S. Pat. Nos. 10,228,655, 10,289,070, US patent applications publication Nos. 20170242398, 20170185036, 20170052508, "High-magnification super-resolution FINCH microscopy using birefringent crystal lens interferometers," PCT/US20201040683, and "Single shot holographic super-resolution microscopy" are each incorporated by reference in their respective entireties. While the incorporated documents provide a thorough explanation of FINCH, a brief description of FINCH is provided below for convenience. One skilled in the art will realize that while the following discussion is recited in the context of visible light, any other wavelengths of electromagnetic radiation can be used similarly with imaging components optimized for said other wavelengths.

Figure 1A:
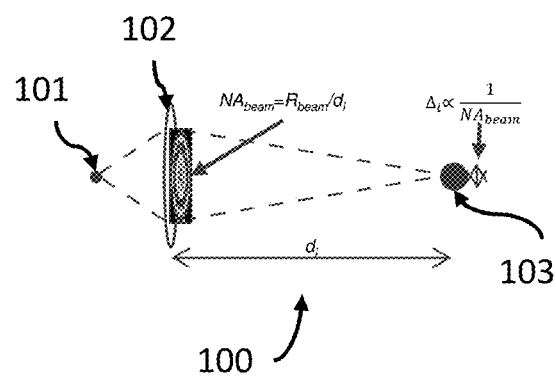
FIG. 1A (prior art) is a schematic of standard widefield imaging.
Figure 1B:
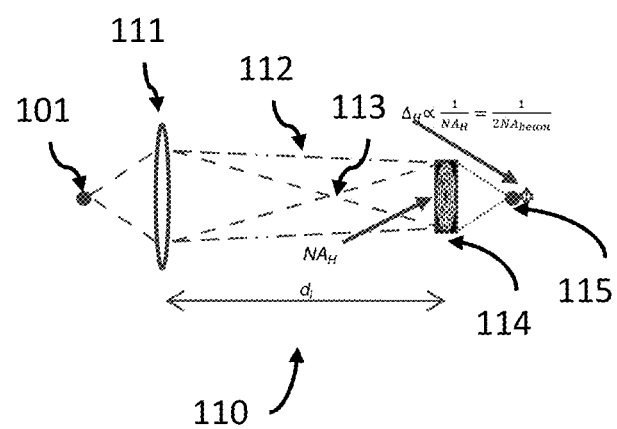
FIG. 1B (prior art) is a schematic of FINCH imaging.

In standard imaging, schematically depicted in 100 FIG. 1A, a beam propagates from an object 101 through a lens 102 to its image 103 with a single phase curvature at any given location in space, and only one plane of the imaged object is in focus at any given time. FINCH (FIG. 1B) is a unique incoherent holographic method that does not require coherent illumination or complicated and lossy reflective or diffractive optics. By contrast to standard imaging, in FINCH 110, an object 101 is imaged by a special optical element 111 that creates a set of two co-propagating beams 112, 113 from the light received from each individual point in the sample, with each of the beams having a different focal length. The beams interfere with each other, since they are co-linear and each of the beam pairs originates from the same point in the object, assuring both spatial and temporal coherence on a point by point basis. Because of the short coherence of incoherent light, light from different points on the object do not interfere with one another, which is why FINCH is termed an incoherent interference method. The 2D FINCH hologram 114 recorded by a FINCH camera is the linear sum of the holograms of all the different points, and is known as the FINCH raw hologram or FINCH recorded hologram. Different planes in the object, wherein the difference is a matter of distance along the optical axis with respect to the FINCH optical system, will produce measurably different holograms on the camera. The interference fringes in the FINCH hologram 114 are related—by well-known relationships detailed in the references incorporated herein—in their position and size to the 3D positions of the points in the object from which they originated, and the fringes may be computationally processed to recover the phase (dependent on the 3D shape) of the object. This 3D phase may be computationally processed (refocused) to reconstruct an image 115 of the object at any 3D position. This image is known as the reconstructed FINCH image. Thus, it can be seen that FINCH enables the collection of a 3D stack of images in a single 2D hologram recording. Note in particular that the hologram 114 has a much larger spatial extent on the image detector (i.e. covers many more pixels on a CCD or CMOS or similarly pixelated camera) than the comparable focused image 103, and has the appearance of a plurality of concentric rings. In effect, this means that the FINCH raw hologram contains many more measurements of the single object point than a standard focused image does, and also contains more detailed features than the single 2D Gaussian shape of a standard image PSF. Furthermore, as discussed in some of the documents incorporated by reference, the maximum optical resolution of a FINCH lens is twice as good as the optical resolution of a classical lens because the angular magnification of FINCH is only half that of the lateral magnification. FINCH is an all-optical super-resolution technique to produce far better images than classical methods. FINCH imaging is especially advantageous since it is an imaging method that captures the entire phase (3D information) of a sample, in a single shot, without an expensive or difficult illumination procedure, and with no need for prior sample knowledge or a training step in the image reconstruction.

Figure 2A:
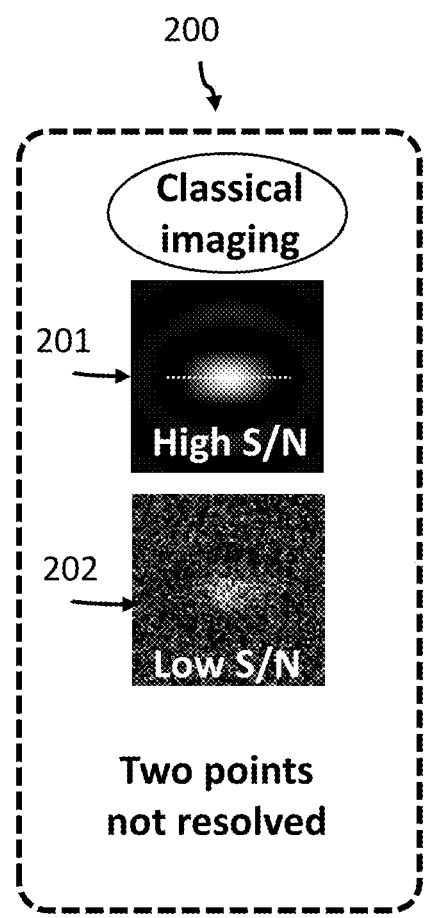
FIG. 2A (prior art) is a diagram depicting simulated standard classical images of a pair of object points under both high and low signal to noise recording conditions.
Figure 2B:
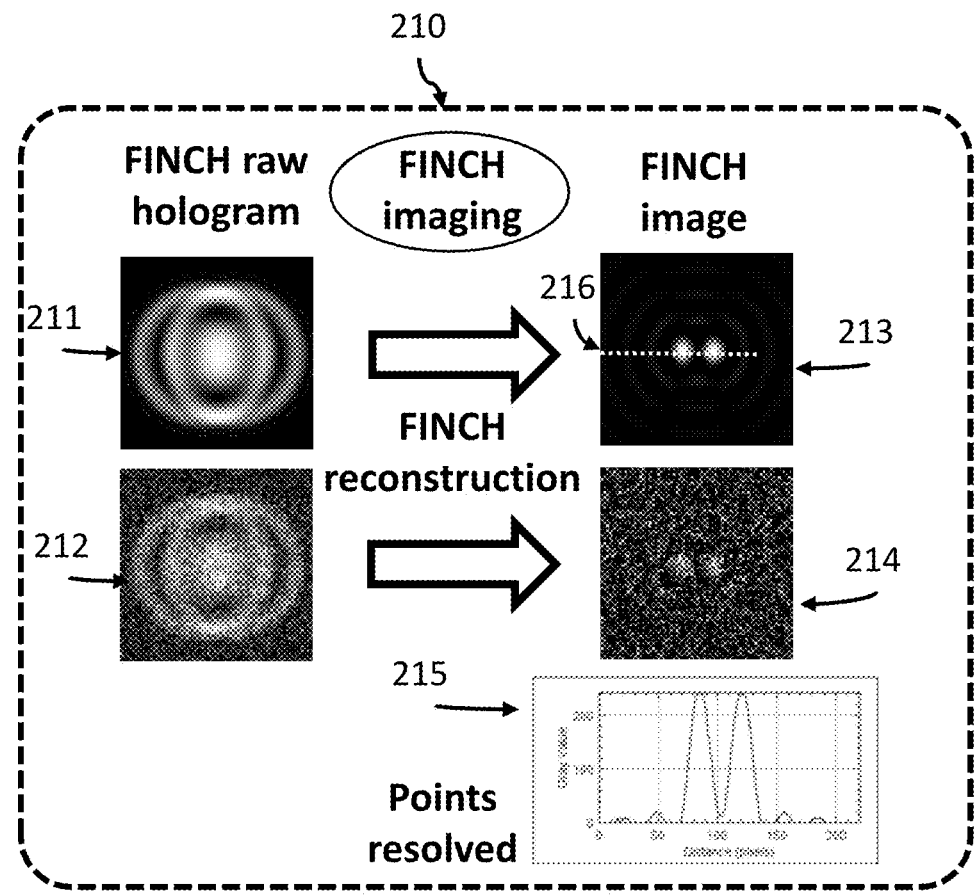
FIG. 2B (prior art) is a diagram depicting simulated FINCH raw holograms and reconstructed images of a pair of object points under both high and low signal to noise recording conditions.

A set of simulated images is presented to further elucidate the performance of FINCH by itself, in comparison to standard (or "classical") imaging. FIG. 2A shows 200 a computational simulation 201 of a classical image of an object containing two points separated by 200 nm. The two points are not resolved at all, i.e. there is no place between them in which there is a loss of intensity that would correspond to an image of the space between the points. Also shown is an image 202 of the points wherein camera noise or weak illumination render the image barely distinguishable from that of a single point. In the case of FINCH 210, as shown in FIG. 2B, the resolution is about two times better than classical imaging, on the order of 100 nm. This is pictorially represented in 211, showing that the recorded FINCH raw hologram (of the same two-point object as in 201) is processed computationally by FINCH reconstruction to achieve a reconstructed image 213 with higher resolution than classical imaging. The line profile 215 taken across the dashed line 216 depicted in reconstructed image 213 shows this improved resolution graphically. The noisy raw hologram 212 can also be discerned as a two-point object after processing into the reconstructed image 214, showing that the FINCH method is robust to noise.

There are a number of image processing methods for improving resolution of an image after the image has been recorded. One of the most common types of methods is deconvolution, in which the recorded image is computationally processed with an algorithm utilizing a point spread function (PSF) describing the optical characteristics of the imaging system. This type of approach can be considered a "top-down" approach in which the recorded image is itself the source for the refined higher-resolution image. In recent years it has also become possible to algorithmically build models of the imaged object, at arbitrarily high resolution, on a point by point basis. This type of approach can be considered a "bottom-up" approach in which the higher-resolution image is built ab-initio, which is a qualitative difference from the top-down deconvolution approaches. In the model-building approaches, the initial model object may be an object with a truly random distribution of intensity, or it may be based to some degree on the recorded image in order to have a starting point that is closer to the optimal solution than a truly random object. Whatever the source of the initial model object, the model object may be compared to the observed images by computationally creating a simulated image using the model object and incorporating detailed knowledge of the PSF of the optical system that created the recorded image. For example, the locations of the points in the model object may be convolved with high-resolution representations of the PSF to generate a simulated image. The incorporation of the high-resolution PSF confers greater accuracy in the simulated image which increases the ability to score or judge the match of the model object to the actual object. The quality of the match may then be assessed, and if desired the model object may be altered or improved for the next round of comparisons in the algorithm. The points used to construct the model object may be of any size, therefore conferring extremely high inferred resolution onto the model object representation of the real object. The same FINCH raw holograms that can be processed by reconstruction methods may also be processed by a model-building method to increase the resolution even further, even from extremely noisy images. While the method is computationally intensive in memory and processing power and time, it can be made to run far faster by using GPU or other parallelized computational processing. Further increases in practical speed can be obtained by identifying the most important areas in an image and only running the model-building analysis on the selected areas, which may be far smaller and require far fewer computational resources than the entire image.

Figure 3:
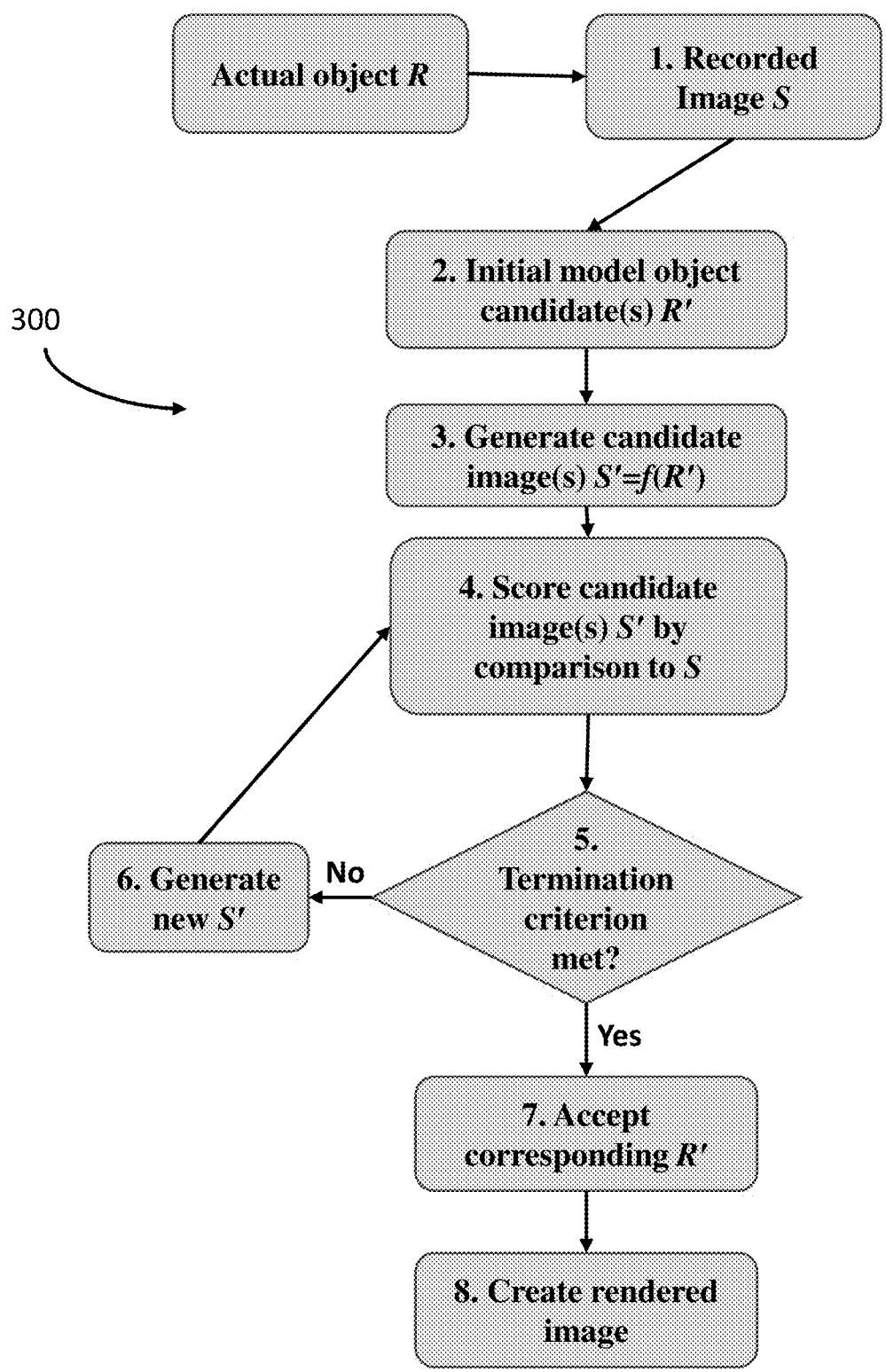
FIG. 3 is a schematic of an image processing algorithm.

A brief summary of an exemplary general iterative process to improve the resolution of processed images that were reconstructed from holograms, or holograms themselves, follows below, with reference to algorithm 301 in FIG. 3.

1. Record an image S (a hologram, or the image reconstructed from a hologram) of an object R.
2. Build a model (or estimated) object candidate R' comprising a fixed number of infinitesimally small (sub-resolution) points located in the FOV of the observed image. The initial estimated object candidate is a collection of points, represented as spatial coordinates in a numerical array in computer memory. A set of a plurality of model objects, each of which is a collection of points represented as spatial coordinates in a numerical array in computer memory may also be used.
3. Create a simulated candidate image S' incorporating every individual estimated object point using the known PSF of the imaging system, and compare this simulated image to the recorded image. If a plurality of model objects is used, create S' as a set of a plurality of candidate images, one candidate image from each of the model object candidates.
4. Score the simulated image on how well it matches the recorded image. The score may be based on the L2 norm of the candidate image and the recorded image, or another norm, or any other comparison metric. If a plurality of model objects is used, score each of the candidate images in S'.
5. Determine if a termination criterion is met. Compare the total score of the current iteration of the simulated image candidates to the score of the previous iterations to determine if the image processing algorithm should be terminated. If the score of the image candidate or the best score of any of the candidates in a set of a plurality of image candidates has not changed in a concerted way over a specified number of iterations (for one example, if the score has not improved by more than 1% over the previous 10 iterations), or has reached a pre-established satisfactory value (for one example, a normalized L2 norm of 0.8 or higher), terminate the algorithm and carry the current model object points onto step 7. If the score has not reached one of the termination criteria, then continue to step 6 below.
6. Generate a new R'. Apply an alteration to the model object(s), either by random variation of some of the points therein, or by applying a corrective factor derived from the comparison of step 4. Generate a new simulated image or set of images S' from the new model object candidate or set of model candidates. Use this new simulated image in a new iteration of step 4 above.
7. Accept the model object candidate as the best possible processed representation of the actual object R. If a set of a plurality of model object candidates was used, accept the candidate with the best score as the actual object R.
8. Create a rendered ultra-high-resolution image from the final set of model object points by convolving the points with a PSF representing the resolution that is statistically supported by an analysis of the imaging system coupled with the model building approach. This resolution PSF is not the classical PSF and may be calculated based on analysis of the knowledge of the classical PSF, the statistical analysis of the noise in the observed image, and several other factors.

In both top-down and bottom-up image processing methods, one of the ways to maximize the resolution in the processed image is to use a genetic algorithm to evaluate a set of many processed images in every comparison step (step 4 of the list), and use the best of these processed images to generate a new set of processed images in step 6, if necessary. Such an algorithm can be terminated whenever the top score of any processed image in the set reaches convergence. This type of approach enables the image processing method to search for many more unique optimal solutions than algorithms that use only a single processed image at every step of the image processing method. A discussion of image resolution improvement using genetic algorithm methods is found in Yangyang Li, Yang Wang, Yaxiao Li, Licheng Jiao, Xiangrong Zhang, and Stolkin Rustam, "Single image super-resolution reconstruction based on genetic algorithm and regularization prior model" Information Sciences 372, 196-207 (2016).

In a previously known implementation of a method (Sandra Martinez, Micaela Toscani, and Oscar Martinez, "Super-resolution method for a single wide field image deconvolution by superposition of point sources," Journal of Microscopy 275(1), 51-65 (2019)) similar to the algorithm described above in steps 1-8, the classical PSF is assumed in the observed image. The method claims to beat the classical limit by a factor of ca. 5, by using a plurality of different model objects, each of which is compared to the recorded image similar to step 4 above. A genetic algorithm is then used in step 6 and is applied to the set of model objects to keep a fraction of the best matches and generate new model objects to complete a new improved set of model objects. The new group of model objects is then returned to the comparison step and the process is iterated until the iterative improvement between the best match in each iteration of the model object set becomes negligible. The inventors of the present disclosure have realized that the use of a model-building approach with FINCH holograms or reconstructed images may provide significant and unexpected advantages over such approaches used with classically generated images. As is well known, the PSF of the reconstructed FINCH image is narrower than that of classical imaging by up to a factor of 2; this implies that coupling the FINCH reconstructed image with a model-building approach could result in a new method with resolution twice as high, beating the classical limit by as much as a factor of 10. This is the result of the new HURT method. Furthermore it is worth considering what benefit might be gained from using the model building approach with observed images recorded with the PSF of the raw hologram. In such a case, the recorded image of every point is spread out over many more pixels than in classical imaging. With so many more measurements of the recording PSF, it is possible to obtain a more statistically sound idea of the image recording PSF even at low signal-to-noise (S/N) image recording, since random noise in the recording pixels is averaged out to a much greater extent than with classical imaging. Additionally, with a better measurement of the image recording PSF, it is possible that the scoring results will have a higher contrast, i.e. a greater sensitivity to model/observed image mismatch that could lead to greater accuracy in scoring and thus faster performance and potentially higher resolution. Another advantage in current FINCH methods is that four phase shifted raw holograms are recorded at once. Effectively, this is four different points of view of the same scene. The four points of view may be used to create parallel or joint model building approaches to improve resolution performance even more than by using the reconstructed FINCH image alone, by identifying the single model object that best suits all four points of view at the same time. Since the interspersed image recording in this FINCH method provides four sparse representations of the image, it is further possible to take advantage of the built-in sparsity prior in the model building and image calculation. Another advantage is the use of a model-building method with the complex-valued FINCH hologram as the observed image. This is a coherent image-recording PSF, which provides another point-of-view for the current model-building invention. Another advantage is the fact that FINCH has a depth-variant PSF. Thus, an observed image with a 3D collection of object points could be analyzed by a model-building approach with several 3D planes of model object points and the unique depth-dependent PSF for each plane, allowing the creation of a super-resolved 3D image from a single 2D recorded image. Note that in the current implementation of FINCH, 3 or 4 phase altered representations of the image are simultaneously captured. Thus HURT can provide enhanced 3D resolution far and beyond any current technology, and all from a single snapshot.

Figure 4A:
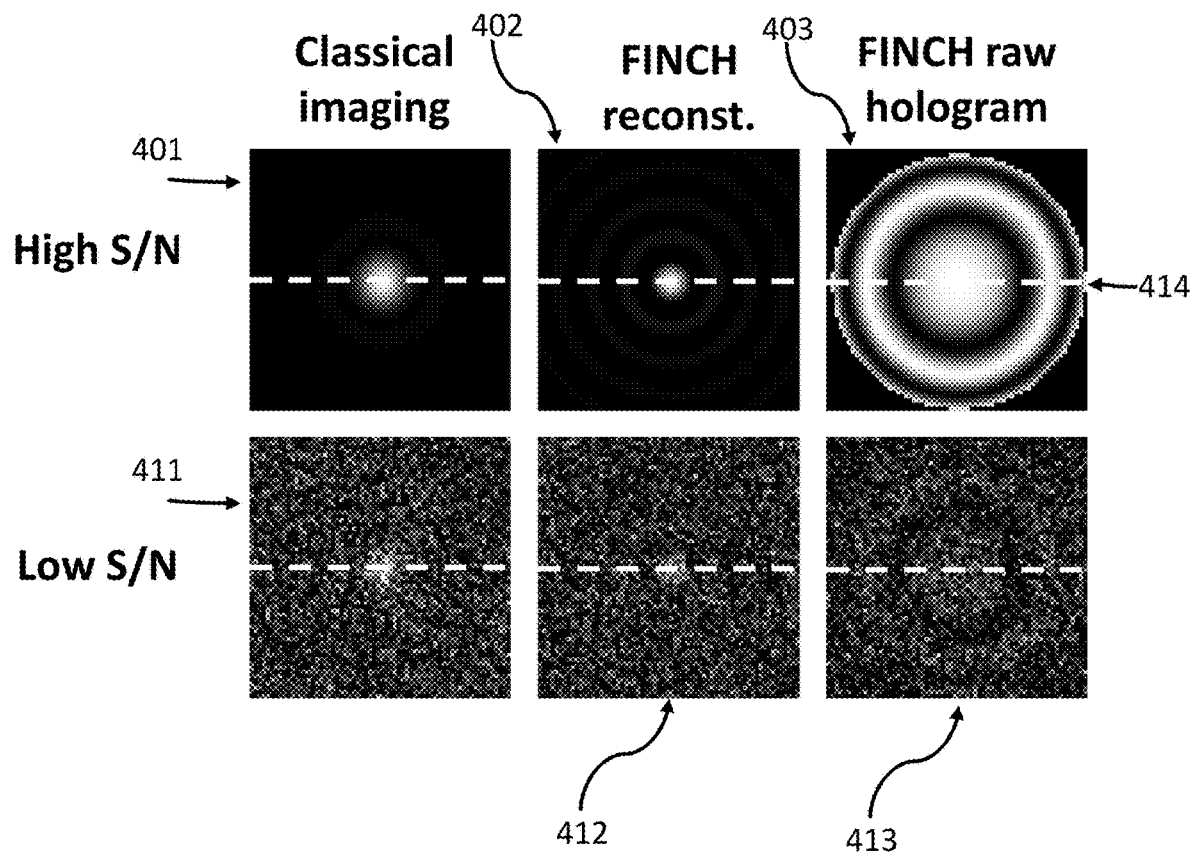
FIG. 4A is a diagram containing simulated standard classical images and FINCH raw holograms and reconstructed images of a single object point under both high and low signal to noise recording conditions, with indicated position of an intensity line profile.
Figure 4B:
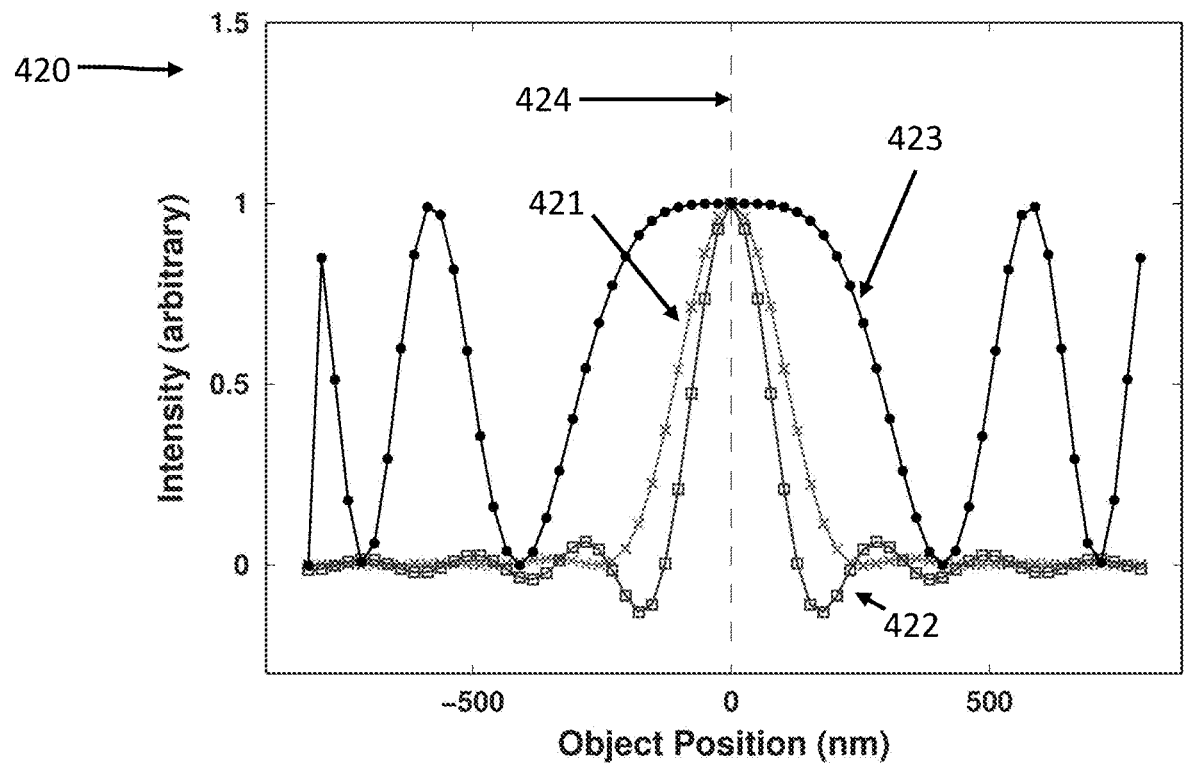
FIG. 4B contains a plot with line profiles depicting the intensities of classical and FINCH raw holograms and reconstructed images with high signal-to-noise ratios.
Figure 4C:
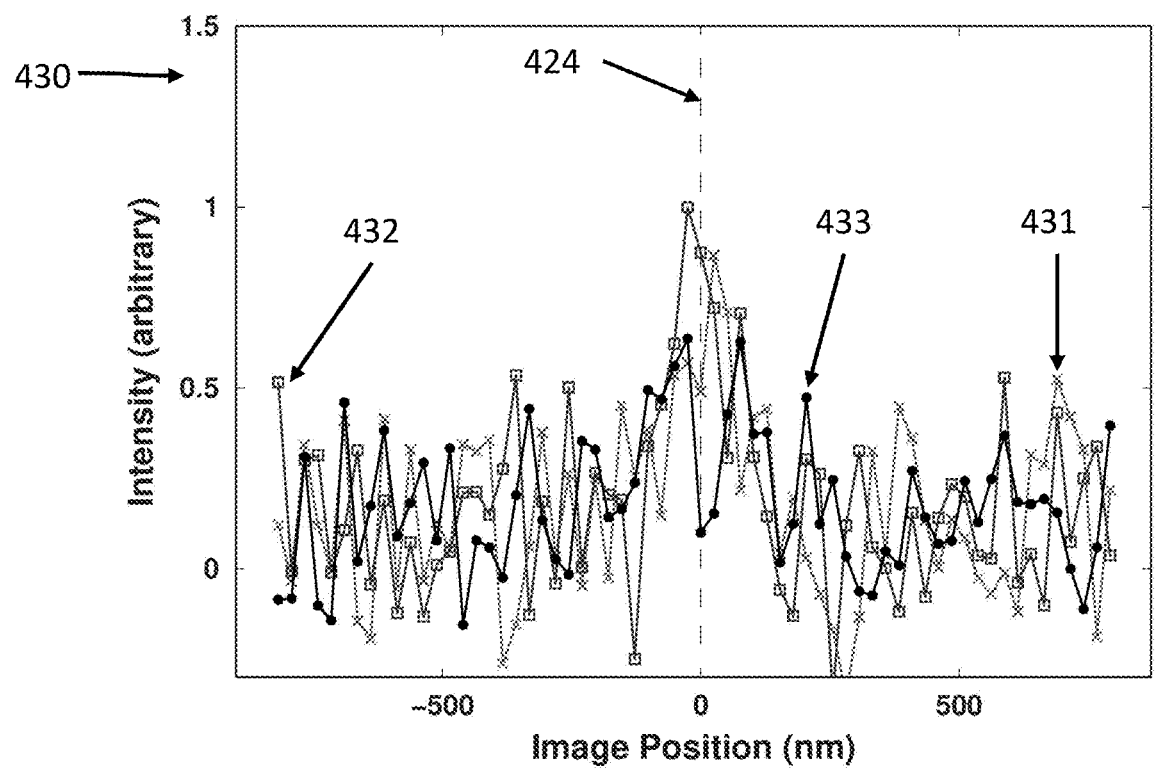
FIG. 4C contains a plot with line profiles depicting the intensities of classical and FINCH raw holograms and reconstructed images with low signal-to-noise ratios.

A series of imaging simulations have been performed to demonstrate these teachings. In FIG. 4A are shown six computationally simulated images 401-403, 411-413 that serve as observed images representing single object points located at (x,y)=(0 nm, 0 nm) in the images. The images are 64×64 pixels, with the pixel indices running from −32 to 31 from the upper left corners of the images. These are essentially the PSFs of image recording. The images are of classical fluorescence imaging 401, the respective FINCH reconstructed image 402, and the respective FINCH raw hologram 403. The top row of images 401-403 have high signal-to-noise (S/N) characteristics wherein the recordings were simulated without any noise, and the bottom row 411-413 have low signal to noise wherein simulated noise was added with a gaussian distribution with a mean of 0 and $\sigma=0.1$, with an image peak intensity of 1 (before noise was added) and a constant background of 0.2 (before noise was added). Wavelength, simulated image magnifications and all other factors were the same between all images; only the imaging method and S/N were altered as indicated. Each pixel represents 25.5 nm of space in the object coordinates. FIG. 4B contains a plot 420 with line profiles 421, 422, 423 through the peaks of the respective images 401, 402, 403 as indicated by the dashed lines 414 in the images. FIG. 4C contains a plot 430 with line profiles 431, 432, 433 through the peaks of the respective images 411, 412, 413 as indicated by the dashed lines in the images. In plots 420 and 430, the vertical dashed line 424 denotes the known exact location of the simulated object point. Note that these plots and all others presented herein are taken along a single row in x at y=0, so further discussion will only include discussion of data in x; however the discussion is generalizable to the y axis as well and any mutual projection along both axes. In all instances, note that the FINCH raw hologram image is much larger and evenly distributed over many more pixels than the image from classical imaging. Note that the noisy image conditions shown in 411-413 and were enough to almost completely drown out the signal altogether. However, even under such noisy conditions, accurate super-resolved localization of points in a model object is possible when using a FINCH raw hologram as the recorded image, as will be shown herein.

The most basic action of the model-building approaches is the matching of a single model object point to a single image spot in the recorded image. A model-building image reconstruction of the simulated images 401-403, 411-413 was performed in order to assess the characteristics of this basic step when using images with different PSFs (standard optical, FINCH reconstructed image, FINCH raw hologram) with both high and low S/N. The simulated model-building approach consisted of creating a set of model object points as guesses for the actual position of the object point, and then creating and scoring the simulated image of each of the model points as in the algorithm described above. In this case the observed images were 64×64 pixels, and the set of guesses consisted of a block of 128×128 model object points representing the central 16×16 pixels of the observed images. That is, each of the central 16×16 pixels of the observed images was represented in the model set by an evenly spaced grid of 8×8 points. The final 128×128 grid of model points was scored with the L2 norm of the difference of the simulated model image and the simulated observed image. The score is referred to as the fit error, and lower L2 norm scores (fit errors) correspond to better imaging performance. However, for display purposes in the plots shown in the Figures, the fit errors were inverted into a score called the match quality, in which higher scores indicate better matches and imaging performance. The point-by-point scores for each grid were assembled into images, and the line profiles through the best score were placed into the plots in FIGS. 5-7. Said plots are all linear plots passing through the x=0 axis as discussed earlier. Since the observed image was of a single point, the best match quality score was identified as the best positional match.

Figure 5A:
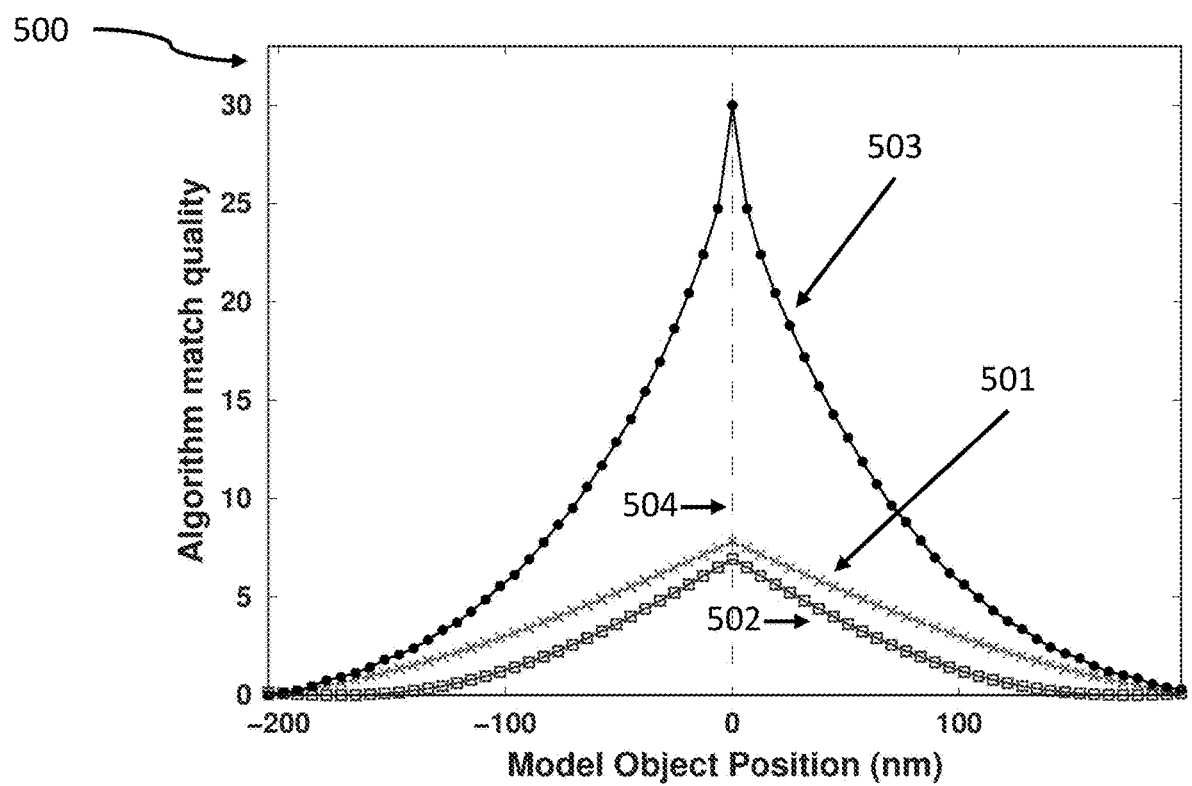
FIG. 5A contains a plot showing the match score curves of a model object point at various locations respective to the location of a simulated object point under high signal-to-noise conditions.
Figure 5B:
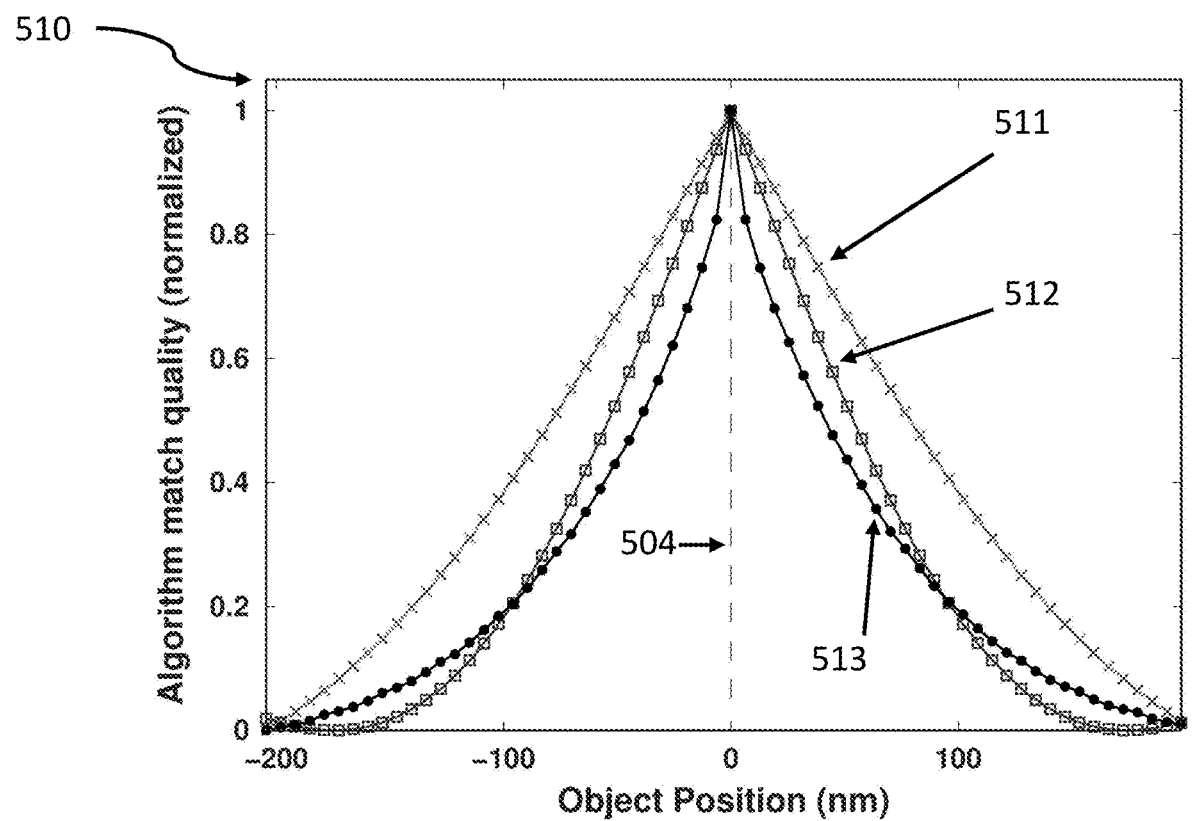
FIG. 5B contains a plot showing the normalized match score curves of a model object point at various locations respective to the location of a simulated object point under high signal-to-noise conditions.

In FIG. 5A is the plot 500 of the match qualities of the simulations with high S/N, with score curves 501, 502, 503 from simulated match quality scores of object 401, 402, 403. The dashed line 504 denotes the exact location of the object point in the simulated recorded image, while the data curves 501-503 represent the match quality scores of model object points located at various positions in the model object. The most obvious observation is that the FINCH raw hologram score curve 503 has by far the highest contrast—i.e. the greatest difference between the model image point and observed image point. This is due to the facts that the hologram PSF is so much larger than the other images and that the total difference is a sum of the differences of all the pixels in the image; with more pixels in the image, the integrated intensity of the image is higher and the integrated differences in intensity are higher as well. On its own the high contrast suggests a significant improvement by using the FINCH raw hologram as the image method. However, reference to FIG. 5B containing the normalized match quality plots 510 for the high S/N images 401, 402, 403 shows the advantage in greater detail—the classical match quality curve 511 is the widest, indicating the worst resolution. The FINCH reconstructed image match quality curve 512 is significantly narrower than the classical image, indicating significant improvement in resolution. The FINCH raw hologram match quality curve 513 is the narrowest and most sharply peaked; in addition to being the easiest to see (highest contrast), it is also the narrowest by far, indicating that it will be both more sensitive and better performing as a basis for a model-building super-resolution imaging method. This curve 513 suggests that sub-10 nm resolution is achievable due to the sharpness of the peak of the FINCH raw hologram curve. In all three methods, the match quality score peaks at the known position of the object point at x=0, indicating all three methods are capable of perfect localization, though the FINCH raw hologram method may reach the best fit faster than the other methods. It is worth noting that the phase of the raw hologram and the number of Fresnel ring features therein are both factors that can have an effect on the match quality score curve of the raw hologram, and better curves than the one shown are feasible.

Figure 6A:
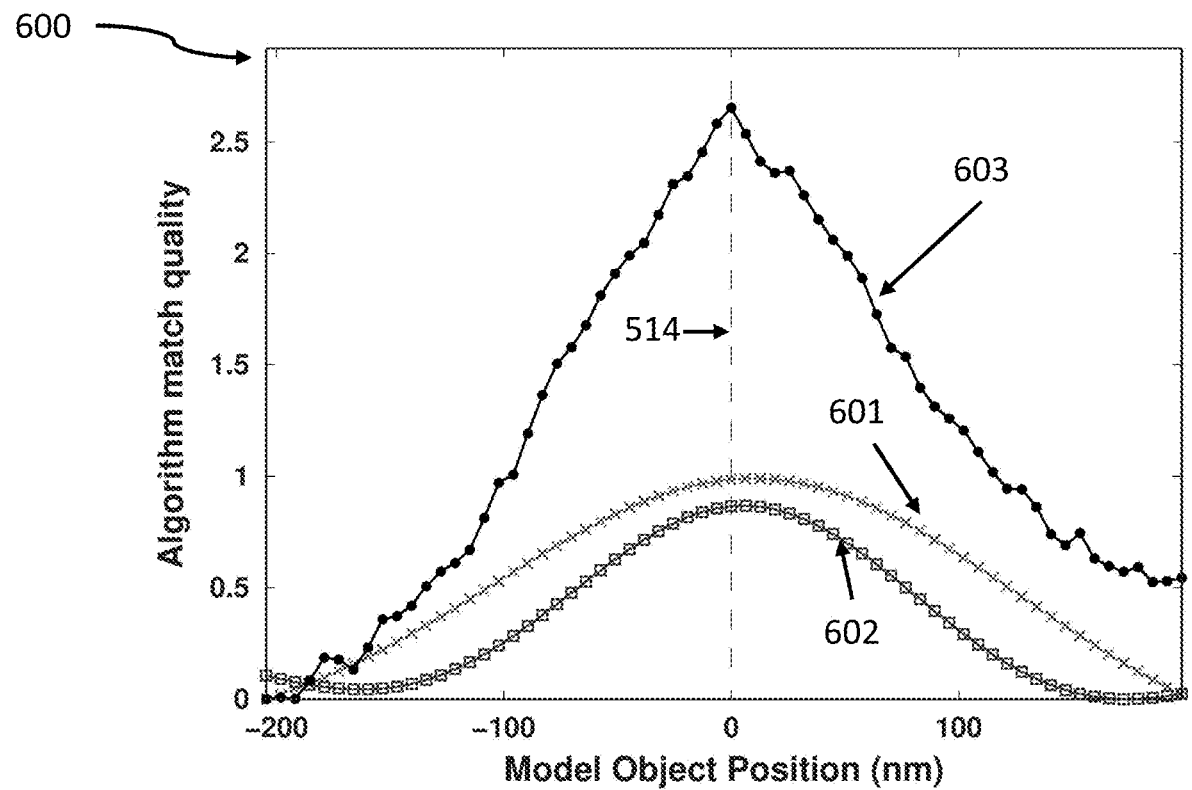
FIG. 6A contains a plot showing the match score curves of a model object point at various locations respective to the location of a simulated object point under low signal-to-noise conditions.
Figure 6B:
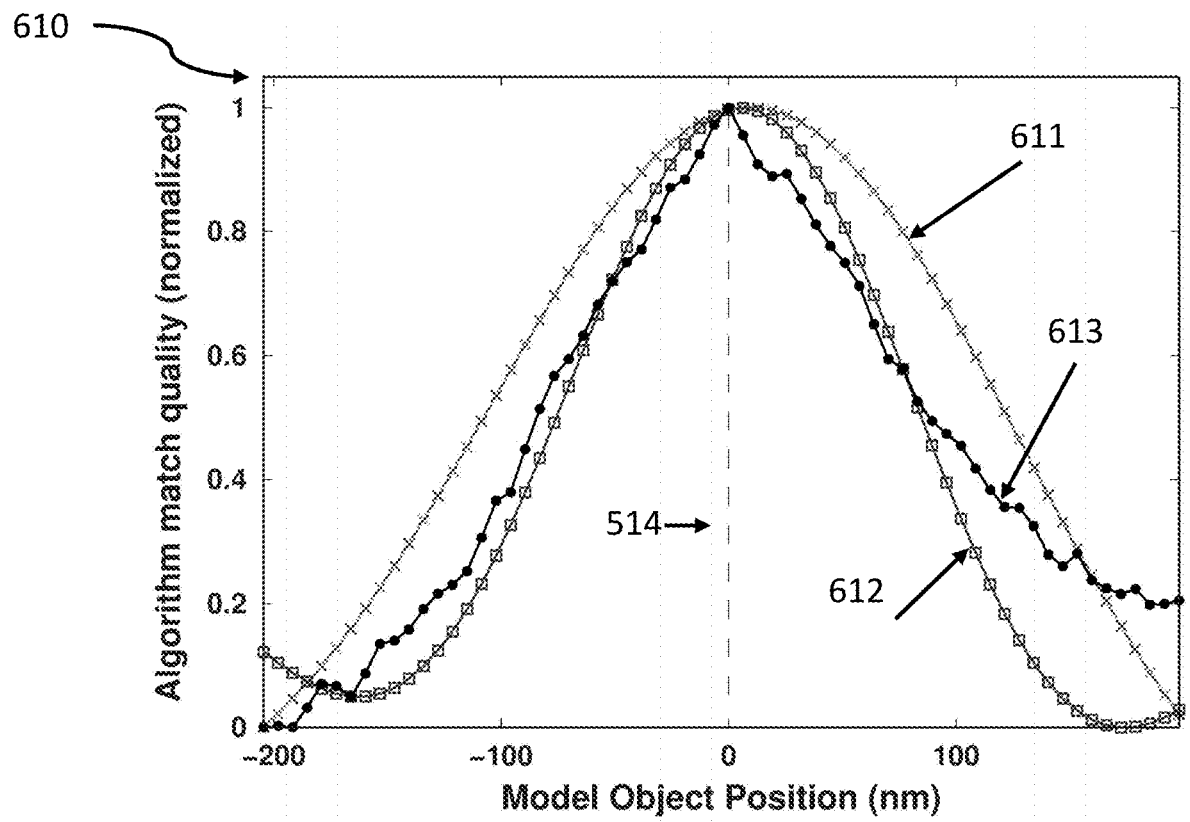
FIG. 6B contains a plot showing the normalized match score curves of a model object point at various locations respective to the location of a simulated object point under low signal-to-noise conditions.
Figure 7:
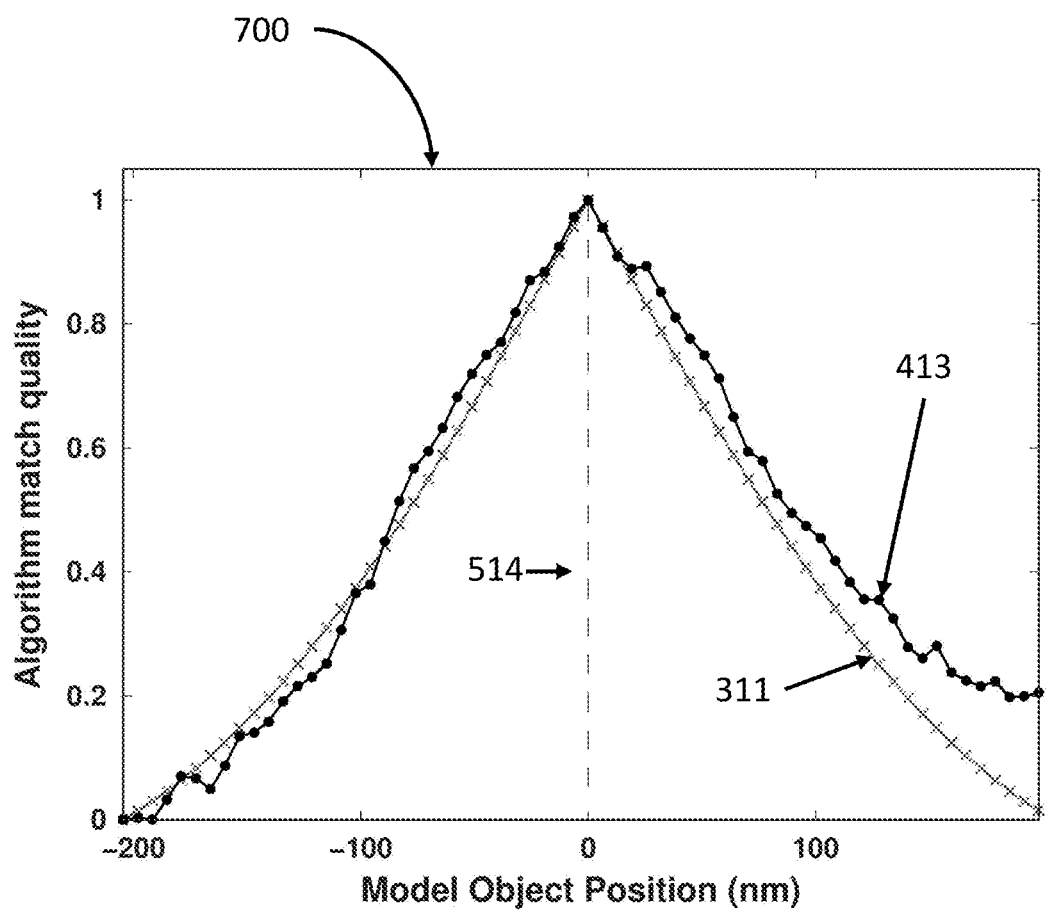
FIG. 7 is a plot showing the normalized match score curves of a model object point at various locations respective to the location of a simulated object point under high and low signal-to-noise conditions.

In FIG. 6A, which shows 600 the match quality score plots of the low S/N observed images 411, 412, 413 similarly to FIG. 5A above for high S/N, the contrast in the FINCH raw hologram curve 603 is observably better than either of the other methods 601, 602, by as much as a factor of 10. This alone suggests that the FINCH raw hologram outperforms the other two methods at high noise, but the shapes of the curves that are made more easily understandable in the normalized plot 610 shown in FIG. 6B are even more indicative of this superiority. In 610, all the curves are broader than the high S/N curves 511-513 from 510 FIG. 5B, but the classical method 611 suffers the most, with no sharp peak at all. The FINCH reconstructed image curve 612 broadens significantly as well, with several points near the maximum difficult to distinguish from each other. Alone amongst these, the FINCH raw hologram curve 613 maintains a sharp peak and broadens the least. Furthermore, careful examination of the image shows that the FINCH raw hologram is the only curve representing a perfect localization of the actual object point (at x=0) by the model object point of the quality matching procedure. The peaks of the classical and FINCH reconstructed images are offset from the known location of the actual object point. In fact, reference to plot 700 in FIG. 7 with selected normalized curves 511, 613 of two imaging conditions shows that the match quality score of the FINCH raw hologram under severely noisy recording conditions still performs at least as well as the classical method under perfect imaging conditions.

Figure 8A:
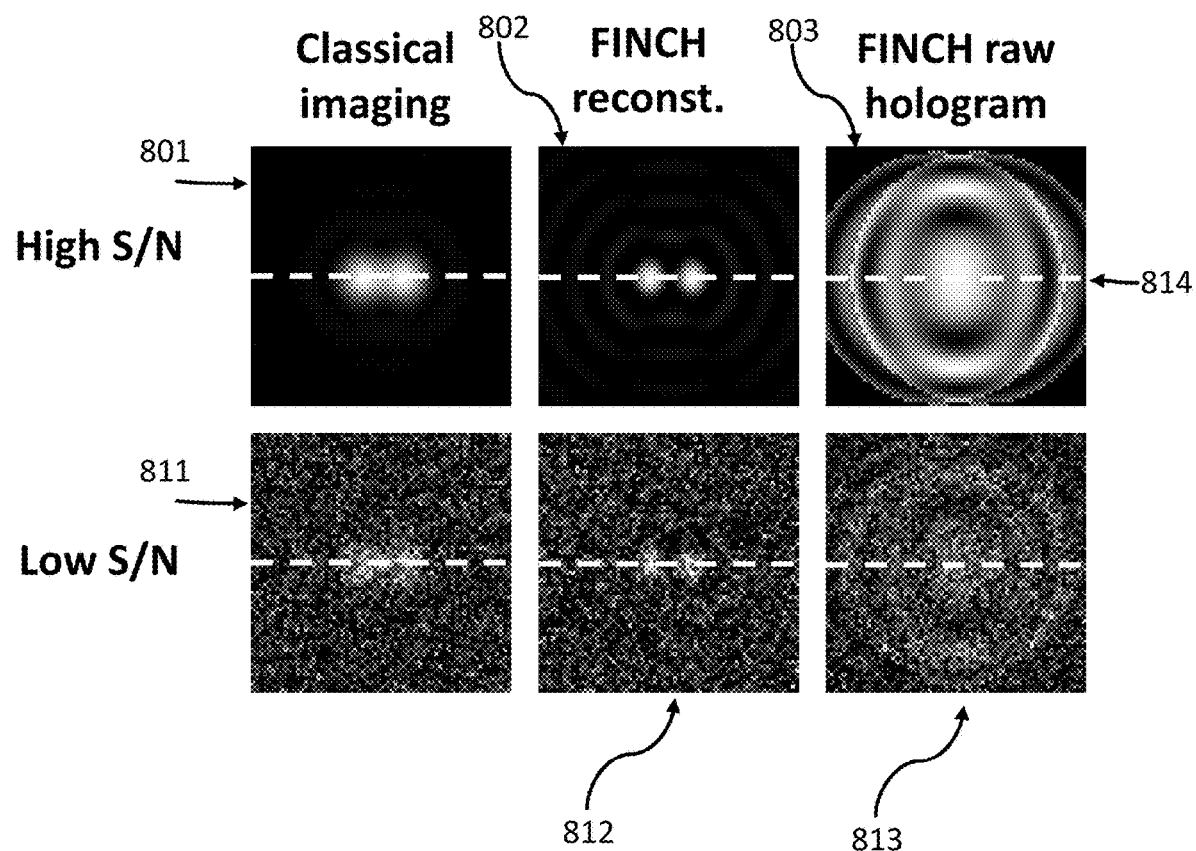
FIG. 8A is a diagram containing simulated standard classical images and FINCH raw holograms and reconstructed images of a pair of object points under both high and low signal to noise recording conditions, with indicated position of an intensity line profile.
Figure 8B:
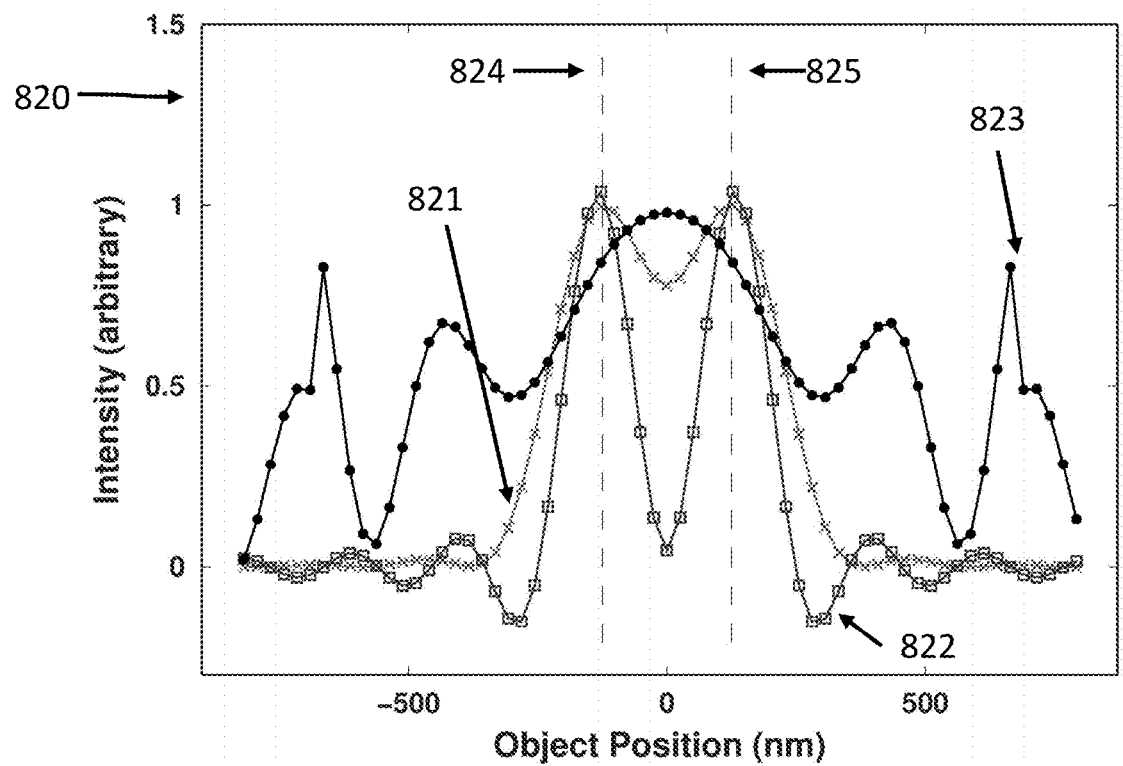
FIG. 8B contains a plots with line profiles depicting the intensities of classical and FINCH raw holograms and reconstructed images of a pair of object points recorded with high signal-to-noise ratios.
Figure 8C:
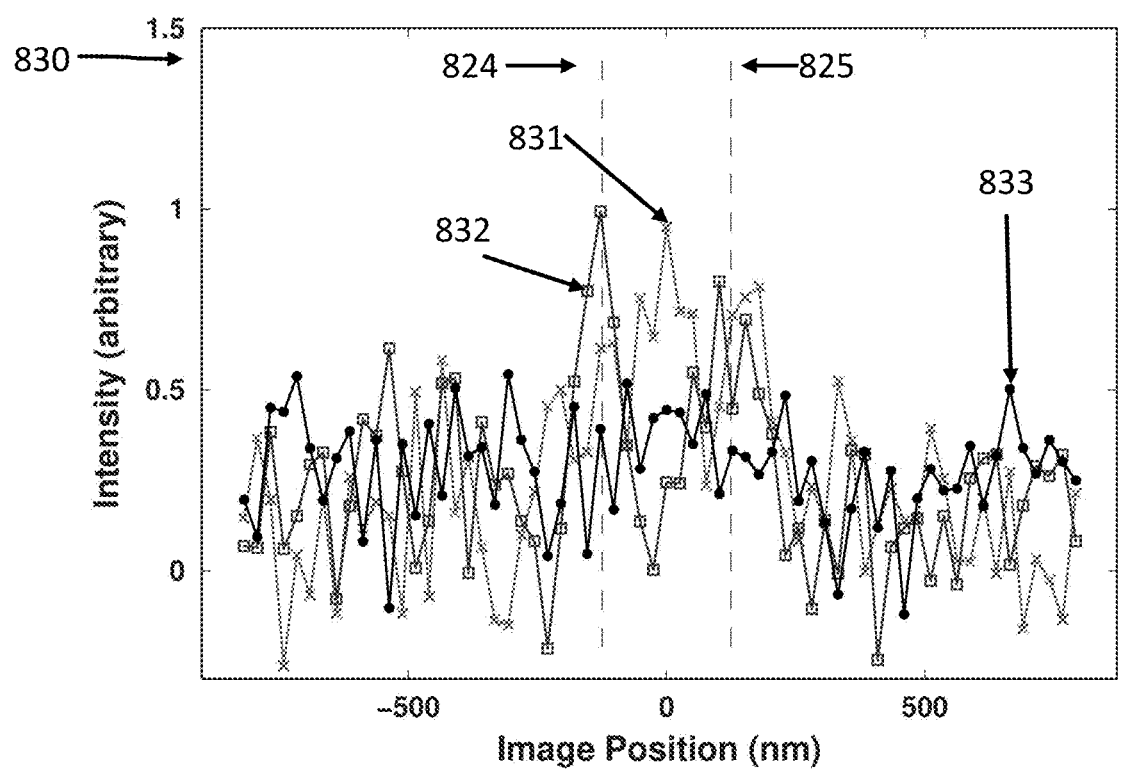
FIG. 8C contains a plots with line profiles depicting the intensities of classical and FINCH raw holograms and reconstructed images of a pair of object points recorded with low signal-to-noise ratios.
Figure 9:
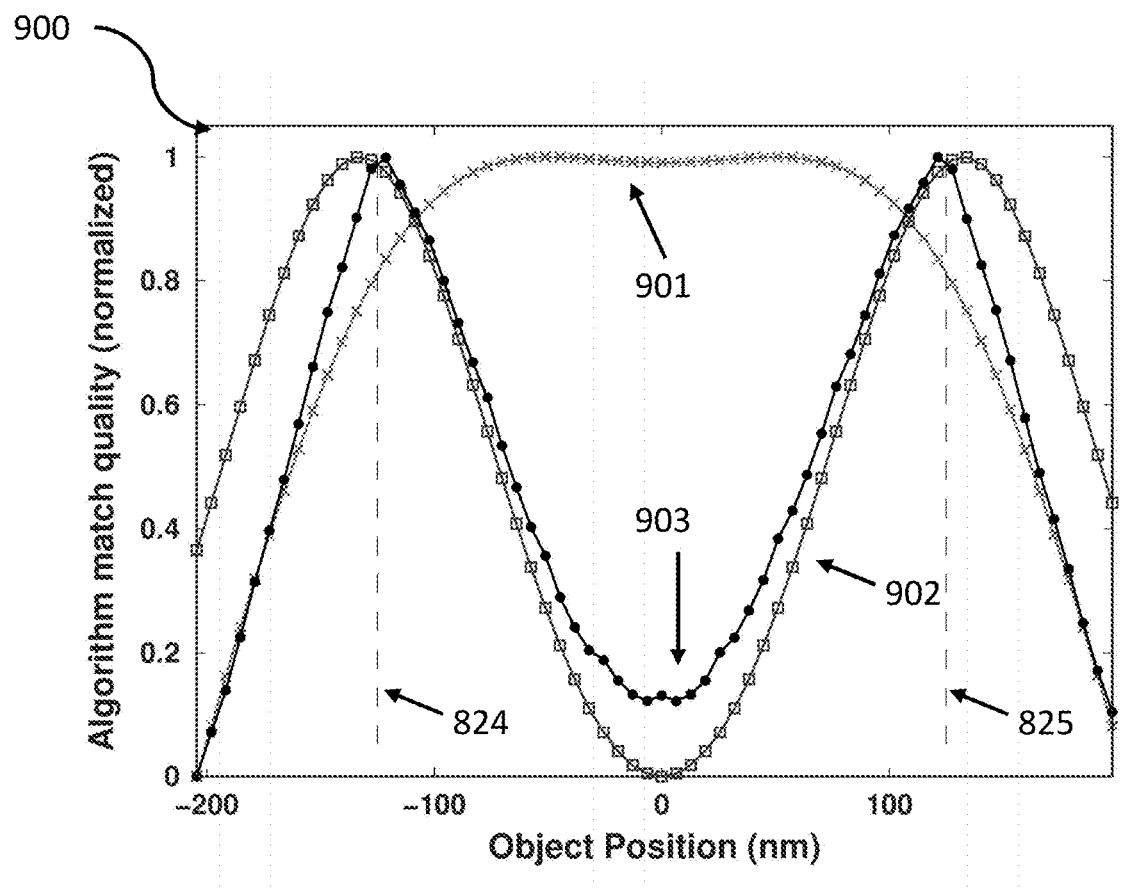
FIG. 9 contains plots showing the match score curves of a model object point at various locations respective to the location of a pair of simulated object points under high signal-to-noise conditions.
Figure 10:
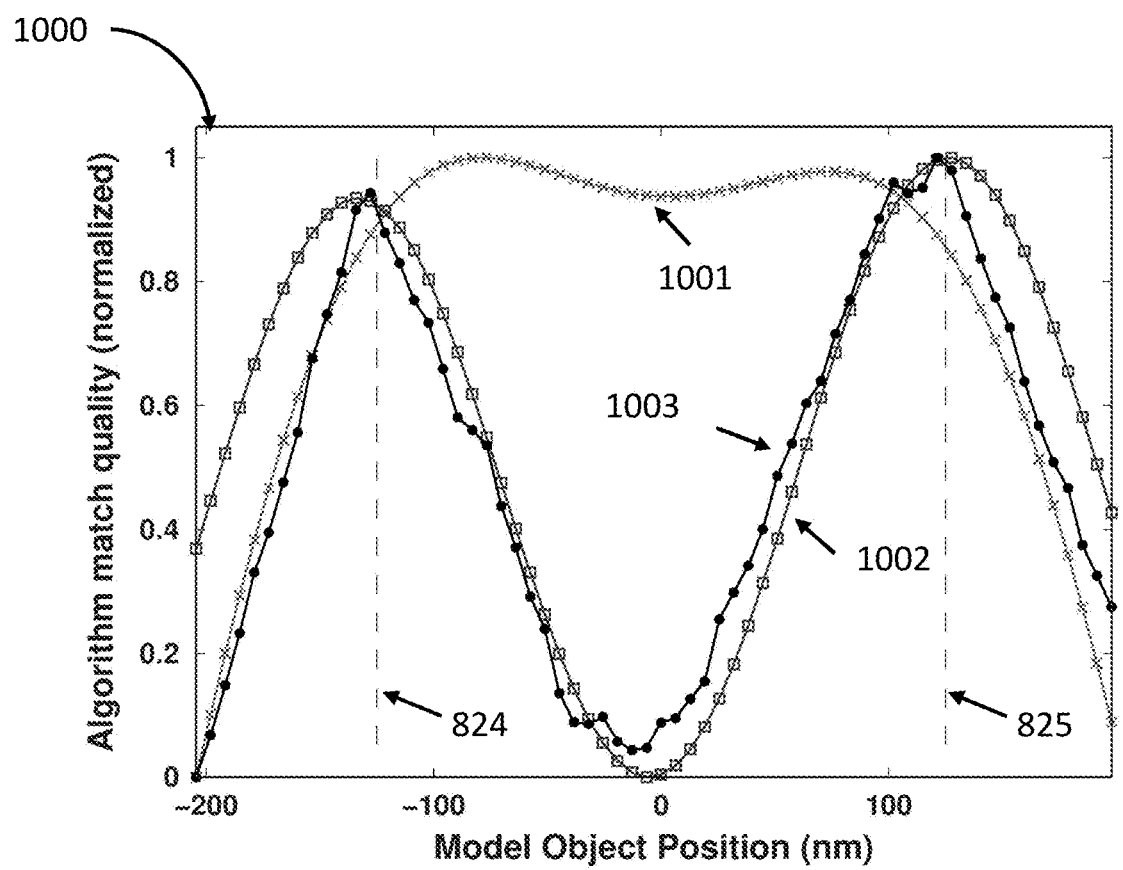
FIG. 10 contains plots showing the match score curves of a model object point at various locations respective to the location of a pair of simulated object points under low signal-to-noise conditions.

To further demonstrate the superiority of the FINCH raw hologram-based method, a further simulation was performed on a sample object containing two points in the observed image. The two points were separated by 250 nm, located at (x,y)=(−125 nm, 0 nm) and (x,y)=(125 nm, 0 nm); in all other respects the simulations were performed exactly as above for single object points. FIG. 8A is analogous to FIG. 4A, and shows the observed images 801, 802, 803, 811, 812, 813 simulated for a two-point object with various PSFs and high or low S/N ratio. FIG. 8B contains a plot 820 with line profiles 821, 822, 823 through the peaks of the respective images 801, 802, 803 as indicated by the dashed lines 814 in the images. FIG. 8C contains a plot 830 with line profiles 831, 832, 833 through the peaks of the respective images 811, 812, 813 as indicated by the dashed lines in the images. In plots 820 and 830, the vertical dashed lines 824, 825 denote the known exact locations of the simulated object points. FIG. 9 is the normalized match quality score plot 900 for the imaging cases with no noise (high S/N). The plot 900 contains dashed lines showing the true positions of the recorded object points 824 and 825, and shows that the FINCH reconstructed image in curves 902 and the FINCH raw hologram in curve 903 show much better resolution than the classical fluorescence imaging case 901, which cannot find a difference between the points. However the key takeaway is the improved localization of the FINCH raw hologram, as the FINCH raw hologram curve 903 locates the position of the points significantly better than the FINCH reconstructed image curve 902. Note the vertical dashed lines 824, 825 that represent the true locations of the object points. The peaks of the match quality curves show where the method interprets the object point position to be. For the FINCH reconstructed image 902, the peaks are somewhat offset from the true locations, while the peaks of the FINCH raw hologram 903 score curve are overlaid exactly with the true locations. This pattern holds true even in the case of the very low S/N data analyzed in plot 1000 in FIG. 10; while the FINCH raw hologram curve 1003 peaks may be slightly offset from the true positions 824 and 825 of the points, the difference is slight, and in any case both peaks match known locations of the actual object points while the FINCH reconstructed image curve 1002 peaks do not both exactly match the known locations 824 and 825. The standard fluorescence curve 1001 does not possess any sharp peaks at all and does not resolve or localize the recorded object points at all. All together, these data indicate that a model building algorithm using FINCH raw holograms as observed images can outperform the same algorithm using classical imaging and FINCH reconstructed images and can realize extremely high two-point resolution imaging with superior localization accuracy even when the images are noisy with low S/N.

In summary, the use of a model-building image analysis method based on images captured by FINCH hologram recording offers some novel advantages over other similar analytical methods:

1. Significantly higher image resolution, of at least twice the resolution of regular model building methods.
2. Improved localization accuracy when using the FINCH raw hologram as the observed image.
3. Faster algorithm performance due to large PSFs that are more likely to register matches between observed image points and model image points.
4. Greatly increased performance under poor signal-to-noise conditions in the observed image—due to the large FINCH raw hologram PSF many more pixel measurements are made of the PSF, and noise in the total measurement of the PSF is averaged out as a result. This can be beneficial for weakly emitting objects, or for reducing exposure time in the case of strongly emitting objects or samples that are sensitive to photobleaching.
5. Ability to use multiple observed images with discrete PSFs (including FINCH raw holograms of different phase factors, complex FINCH holograms, and reconstructed FINCH images) from a single image capture as multiple points of view to enable creation of more accurate models that satisfy all observations simultaneously.
6. Use of sparse observed image representations derived from the interspersed phase shifted raw holograms to reduce the computational resources needed for analysis algorithm performance.

There are a number of methods by which any algorithm can improve the quality of a processed image in an attempt to create a processed image with higher quality than the recorded image. One such method is to create a single processed image at the beginning of the algorithm, and systematically refine this image by incorporating information from the comparison of the processed image to the recorded image. This refinement may be accomplished by applying to the processed image a plurality of image correction matrices derived from the comparison, by methods well known to those skilled in the art. Another refinement method consists of beginning with many different processed images, each of which is termed a candidate image. Comparisons of each candidate image to the recorded image may be made, and then a subset of the candidates with the best comparison scores may be carried through to the next round of the algorithm, along with a set of new candidate images produced by some variational process from the best-scoring candidate images. Each generational set of candidate images will have a top-scoring image, and this image may be accepted as the best possible processed image when the match to the recorded image is optimal. In any implementation of the invention, at any step of any iterative process, the scoring or judgment of processed images is performed according to one or more of several criteria: the L2 norm of the processed image and the original recorded image; another norm of the processed image and recorded image, such as the L1 norm; or another comparison function. The acceptance of any processed image as the best processed image is performed in one of several ways when a criterion for termination of the image processing is reached: when the score or judgement of said any processed image is between certain pre-established values (for example, the score of a processed image is 0.95, and the pre-established value limits are 0.9 and 1); when the score of the processed image in any iteration stops improving significantly over a given number of iterations (for example, the score of the processed image stays within 1% of its value at the $100^{th}$ iteration, over the course of the $100^{th}$-$110^{th}$ iterations); or another termination criterion. It is understood to one skilled in the art that the foregoing are examples of scoring or judgment criteria and termination criteria and the invention as practiced may include criteria outside of those mentioned specifically above.

Accordingly, in one embodiment of the current invention, a digitally recorded image, with the numerical form of an image reconstructed from a FINCH hologram is used with a computational image processing method to create a processed image with improved optical resolution. In the image processing method, an initial processed image is created, and compared to the recorded image. In an algorithmic process, each new iteration of the processed image is generated by applying knowledge gained from the comparison of the previous iteration of the processed image. When the most recent iteration of the processed image is judged to be the best possible processed image, the algorithm is stopped, and this final iteration of the processed image is accepted as the final processed image.

In another embodiment of the current invention, a digitally recorded image, with the numerical form of a raw recorded FINCH hologram of a single phase, is used with a computational image processing method to create a processed image with improved optical resolution. In the image processing method, an initial processed image is created, and compared to the recorded image. In an algorithmic process, each new iteration of the processed image is generated by applying knowledge gained from the comparison of the previous iteration of the processed image. When the most recent iteration of the processed image is judged to be the best possible processed image, the algorithm is stopped, and this final iteration of the processed image is accepted as the final processed image.

In another embodiment of the current invention, a plurality of digitally recorded images, with the numerical forms of a raw recorded FINCH hologram of a plurality of phases, is used with a computational image processing method to create a single processed image with improved optical resolution. In the image processing method, an initial processed image is created, and compared to all of the plurality of recorded images. In an algorithmic process, each new iteration of the processed image is generated by applying knowledge gained from the comparison of the previous iteration of the processed image. When the most recent iteration of the processed image is judged to be the best possible processed image, the algorithm is stopped, and this final iteration of the processed image is accepted as the final processed image.

In another embodiment of the current invention, a digitally recorded image, with the numerical form of an image reconstructed from a FINCH hologram, is used with a computational image processing method to create a processed image with improved optical resolution. In the image processing method, an initial set of processed image candidates is created, and compared to the recorded image. In an iterative algorithmic process, the best subset of the candidates in each current iteration is used to generate a new set of the processed image candidates for the next iteration by applying altering functions to the best scoring subset of the current iteration. When the best-scoring candidate of the most recent iteration of the set of processed image candidates is judged to be the best possible processed image, the algorithm is stopped, and this best candidate is accepted as the final processed image.

In another embodiment of the current invention, a digitally recorded image, with the numerical form of a raw recorded FINCH hologram of a single phase, is used with a computational image processing method to create a processed image with improved optical resolution. In the image processing method, an initial set of processed image candidates is created, and compared to the recorded image. In an iterative algorithmic process, the best subset of the candidates in each current iteration is used to generate a new set of the processed image candidates for the next iteration by applying altering functions to the best scoring subset of the current iteration. When the best-scoring candidate of the most recent iteration of the set of processed image candidates is judged to be the best possible processed image, the algorithm is stopped, and this best candidate is accepted as the final processed image.

In another embodiment of the current invention, a plurality of digitally recorded images, with the numerical forms of a raw recorded FINCH hologram of a plurality of phases, is used with a computational image processing method to create a processed image with improved optical resolution. In the image processing method, an initial set of processed image candidates is created, and compared to all of the plurality of recorded images. In an iterative algorithmic process, the best subset of the candidates in each current iteration is used to generate a new set of the processed image candidates for the next iteration by applying altering functions to the best scoring subset of the current iteration. When the best-scoring candidate of the most recent iteration of the set of processed image candidates is judged to be the best possible processed image, the algorithm is stopped, and this best candidate is accepted as the final processed image.

In all of the above teachings and drawings it is understood that the term FINCH camera or FINCH optical system incorporates a plurality of lenses, mirrors, polarization optics, camera, microscope frame or attachment and any other elements required to record a FINCH hologram as described in the incorporated references. The FINCH camera or FINCH optical system further incorporates a computer control system with one or more processors that controls the operation and function of the FINCH camera or FINCH optical system such as image capture, illumination, timing, storage of recorded images and all other required data. The computer control system also incorporates processing devices, data storage devices, data and software necessary to perform image recording and processing. It is further understood that the computational image processing including computational model building and refinement or processed image refinement is performed using a computer image analysis system with one or more processors and memory and storage that performs the algorithmic steps using suitable software and stores the processed images. The computer image analysis system also incorporates any other processing devices, data storage devices, data and software necessary to perform image processing. The FINCH computer control system and the computer image analysis system may be the same system or may be different systems.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A method for creating a processed image of an object, with image resolution and accuracy improved beyond the corresponding recorded images of said object, comprising:
   recording, using a Fresnel Incoherent Correlation Holography (FINCH) optical system controlled by a computer comprising one or more processors, a recorded image comprising at least one raw FINCH hologram of an object;
   creating, using a computer image analysis system comprising one or more processors, at least one initial processed image candidate incorporating knowledge of at least one point spread function of the FINCH optical system; and
   refining, using the computer image analysis system, the at least one initial processed image candidates into a single processed image of the object wherein said single processed image is of higher optical resolution than the recorded image,
   in which the recorded image comprising at least one raw FINCH hologram is computationally processed using the computer image analysis system into a reconstructed FINCH image prior to the creating of the at least one initial processed image candidate,
   in which the knowledge of the point spread function incorporated into the at least one initial processed image candidate is knowledge of the reconstructed FINCH image point spread function,
   wherein the refining of the at least one initial processed image is accomplished by applying an iterative algorithm to cause the processed image to best match the reconstructed FINCH image, wherein the iterative algorithm includes computational steps of applying a plurality of correction factors to a previous iteration of the processed image to create a new iteration of the processed image, comparing the new iteration of the processed image to the recorded image, and assessing the quality of the new iteration of the processed image, and terminating the algorithm to produce the single processed image from the last iteration.

2. A method for creating a processed image of an object, with image resolution and accuracy improved beyond the corresponding recorded images of said object, comprising:
   recording, using a Fresnel Incoherent Correlation Holography (FINCH) optical system controlled by a computer comprising one or more processors, a recorded image comprising at least one raw FINCH hologram of an object;
   creating, using a computer image analysis system comprising one or more processors, at least one initial processed image candidate incorporating knowledge of at least one point spread function of the FINCH optical system; and
   refining, using the computer image analysis system, the at least one initial processed image candidates into a single processed image of the object wherein said single processed image is of higher optical resolution than the recorded image,
   in which the recoded image comprising at least one raw FINCH hologram is computationally processed using the computer image analysis system into a reconstructed FINCH image prior to the creating of the at least one initial processed image candidate,
in which the knowledge of the point spread function incorporated into the at least one initial processed image candidate is knowledge of the reconstructed FINCH image point spread function,
in which the at least one initial processed image candidate is a set of a plurality of processed image candidates,
wherein the refining of the plurality of processed image candidates is accomplished by applying an iterative algorithm that includes computational steps of selecting the best subset of image candidates from a given iteration of the plurality of processed image candidates, applying a plurality of image altering factors to said subset to create a new plurality of processed image candidates, comparing the new iteration of the plurality of processed image candidates to the reconstructed FINCH image, and assessing the quality of the new iteration of the plurality of processed image candidates, and terminating the algorithm to produce the single processed image from one candidate out of the last iteration of the plurality of processed image candidates.

3. A method for creating a processed image of an object, with image resolution and accuracy improved beyond the corresponding recorded images of said object, comprising:
recording, using a Fresnel Incoherent Correlation Holography (FINCH) optical system controlled by a computer comprising one or more processors, a recorded image comprising at least one raw FINCH hologram of an object;
creating, using a computer image analysis system comprising one or more processors, at least one initial processed image candidate incorporating knowledge of at least one point spread function of the FINCH optical system; and
refining, using the computer image analysis system, the at least one initial processed image candidates into a single processed image of the object wherein said single processed image is of higher optical resolution than the recorded image,
in which the recorded image comprising at least one raw FINCH hologram is a single phase factor of a raw FINCH hologram,
in which the knowledge of the point spread function incorporated into the at least one initial processed image candidate is knowledge of the point spread function of said single phase factor of a raw FINCH hologram,
wherein the refining of the at least one initial processed image is accomplished by applying an iterative algorithm to cause the processed image to best match the single phase factor of a raw FINCH hologram, wherein the iterative algorithm includes computational steps of applying a plurality of correction factors to a previous iteration of the processed image to create a new iteration of the processed image, comparing the new iteration of the processed image to the single phase factor of a raw FINCH hologram, and assessing the quality of the new iteration of the processed image, and terminating the algorithm to produce the single processed image from the last iteration.

4. A method for creating a processed image of an object, with image resolution and accuracy improved beyond the corresponding recorded images of said object, comprising:
recording, using a Fresnel Incoherent Correlation Holography (FINCH) optical system controlled by a computer comprising one or more processors, a recorded image comprising at least one raw FINCH hologram of an object;
creating, using a computer image analysis system comprising one or more processors, at least one initial processed image candidate incorporating knowledge of at least one point spread function of the FINCH optical system; and
refining, using the computer image analysis system, the at least one initial processed image candidates into a single processed image of the object wherein said single processed image is of higher optical resolution than the recorded image,
in which the recorded image comprising at least one raw FINCH hologram is a single phase factor of a raw FINCH hologram,
in which the knowledge of the point spread function incorporated into the at least one initial processed image candidate is knowledge of the point spread function of said single phase factor of a raw FINCH hologram,
in which the at least one initial processed image candidate is a set of a plurality of processed image candidates,
wherein the refining of the plurality of processed image candidates is accomplished by applying an iterative algorithm that includes computational steps of selecting the best subset of image candidates from a given iteration of the plurality of processed image candidates, applying a plurality of image altering factors to said subset to create a new plurality of processed image candidates, comparing the new iteration of the plurality of processed image candidates to the single phase factor of a raw FINCH hologram, and assessing the quality of the new iteration of the plurality of processed image candidates, and terminating the algorithm to produce the single processed image from one candidate out of the last iteration of the plurality of processed image candidates.

5. A method for creating a processed image of an object, with image resolution and accuracy improved beyond the corresponding recorded images of said object, comprising:
recording, using a Fresnel Incoherent Correlation Holography (FINCH) optical system controlled by a computer comprising one or more processors, a recorded image comprising at least one raw FINCH hologram of an object;
creating, using a computer image analysis system comprising one or more processors, at least one initial processed image candidate incorporating knowledge of at least one point spread function of the FINCH optical system; and
refining, using the computer image analysis system, the at least one initial processed image candidates into a single processed image of the object wherein said single processed image is of higher optical resolution than the recorded image,
in which the recorded image comprising at least one raw FINCH hologram is a plurality of phase factors of a raw FINCH hologram,
in which the knowledge of the point spread function incorporated into the at least one initial processed image candidate is knowledge of the point spread function of said plurality of phase factors of a raw FINCH hologram,
wherein the refining of the at least one initial processed image is accomplished by applying an iterative algorithm to cause the processed image to best match the plurality of phase factors of a raw FINCH hologram, wherein the iterative algorithm includes computational steps of applying a plurality of correction factors to a previous iteration of the processed image to create a new iteration of the processed image, comparing the new iteration of the processed image to the plurality of phase factors of a raw FINCH hologram, and assessing the quality of the new iteration of the processed image, and terminating the algorithm to produce the single processed image from the last iteration.

6. The method of claim 5, wherein the plurality of phase factors of a FINCH hologram were recorded simultaneously.

7. The method of claim 5, wherein the plurality of phase factors of a FINCH hologram were recorded sequentially.

8. A method for creating a processed image of an object, with image resolution and accuracy improved beyond the corresponding recorded images of said object, comprising:
   recording, using a Fresnel Incoherent Correlation Holography (FINCH) optical system controlled by a computer comprising one or more processors, a recorded image comprising at least one raw FINCH hologram of an object;
   creating, using a computer image analysis system comprising one or more processors, at least one initial processed image candidate incorporating knowledge of at least one point spread function of the FINCH optical system; and
   refining, using the computer image analysis system, the at least one initial processed image candidates into a single processed image of the object wherein said single processed image is of higher optical resolution than the recorded image,
   in which the recorded image comprising at least one raw FINCH hologram is a plurality of phase factors of a raw FINCH hologram,
   in which the knowledge of the point spread function incorporated into the at least one initial processed image candidate is knowledge of the point spread function of said plurality of phase factors of a raw FINCH hologram,
   in which the at least one initial processed image candidate is a set of a plurality of processed image candidates,
   wherein the refining of the plurality of processed image candidates is accomplished by applying an iterative algorithm that includes computational steps of selecting the best subset of image candidates from a given iteration of the plurality of processed image candidates, applying a plurality of image altering factors to said subset to create a new iteration of the plurality of processed image candidates, comparing the new iteration of the plurality of processed image candidates to the plurality of phase factors of a raw FINCH hologram, and assessing the quality of the new iteration of the plurality of processed image candidates, and terminating the algorithm to produce the single processed image from one candidate out of the last iteration of the plurality of processed image candidates.

9. The method of claim 8, wherein the plurality of phase factors of a FINCH hologram were recorded simultaneously.

10. The method of claim 8, wherein the plurality of phase factors of a FINCH hologram were recorded sequentially.

* * * * *